United States Patent [19]

Reed et al.

[11] 4,136,067

[45] Jan. 23, 1979

[54] HYBRID ION EXCHANGE RESINS WITH IMPROVED PROPERTIES

[75] Inventors: Samuel F. Reed, Holland; James H. Barrett, Neshaminy Valley, both of Pa.

[73] Assignee: Rohm and Haas Company, Philadelphia, Pa.

[21] Appl. No.: 856,826

[22] Filed: Dec. 2, 1977

[51] Int. Cl.² .............................. C08F 8/32; B01J 1/08
[52] U.S. Cl. ...................................... 521/32; 526/52.4
[58] Field of Search ...................... 260/2.1 R; 526/52.4

[56] References Cited

U.S. PATENT DOCUMENTS

| 2,591,574 | 4/1952 | McBurney | 260/2.1 |
| 3,637,535 | 1/1972 | Corte et al. | 526/52.4 |
| 3,991,017 | 11/1976 | Barrett et al. | 260/2.1 E |

Primary Examiner—Joseph L. Schofer
Assistant Examiner—Peter F. Kulkosky
Attorney, Agent, or Firm—John E. Taylor, III

[57] ABSTRACT

Chloromethylated hybrid copolymers are base-functionalized with polyethyleneimines prior to conventional acid functionalization, to produce hybrid resins with markedly improved ion exchange properties.

7 Claims, No Drawings

HYBRID ION EXCHANGE RESINS WITH IMPROVED PROPERTIES

This invention concerns hybrid ion exchange resins which are functionalized with polyalkylene polyamines. It particularly concerns hybrid ion exchange resins in which the macroporous host polymer is functionalized with high molecular weight polyethyleneimine, and more particularly concerns those hybrid ion exchange resins in which the macroporous host polymer is a crosslinked, aromatic polymer functionalized with weak base ion exchange functional groups supplied by high molecular weight polyethyleneimines, and in which the gel guest polymer is functionalized with weak acid ion exchange functional groups.

Hybrid copolymers are known in the art; Barrett et al, in U.S. Pat. No. 3,991,017, describe the nature of hybrid copolymers and their preparation. These copolymers are derived from macroreticular, or macroporous, polymers, that is, polymers with a structure characterized by a network of microscopic channels extending through the mass. While these channels are obviously very small, they are large in comparison with the pores in conventional homogeneous crosslinked gels, pores of the latter type not being visible in electron photomicrographs and, as is well known, not being true pores at all (see Kunin, "Ion Exchange Resins", page 45, et seq. John Wiley & Sons, Inc., 1958). Typically, macroreticular polymers have a surface area of at least 1 sq. meter per gram, and more generally, at least 5 sq. meters per gram, and have pores larger than about 1.5 to 2 millimicrons. It is conventional to produce these macroreticular polymers in bead form, usually in an overall particle size of about 10 to 900 microns.

The hybrid copolymer is prepared by adding fresh monomer suitable for preparing a gel polymer, as for example, an acrylic acid ester, along with catalyst and a suitable crosslinking agent such as divinylbenzene to a suspension of a macroreticular copolymer and water. The monomer is adsorbed, or imbibed, into the pores of the macroreticular copolymer, and the inbibed monomer is polymerized within the macroreticular beads by heating the mixture.

In the process disclosed by Barrett, the hybrid copolymer is functionalized to produce an ion exchange resin which possesses both acidic and basic functionality, and which will remove both cations and anions from cool liquids and return these cations and anions to warm liquids, i.e., which is thermally regenerable. A typical and well-known step in functionalizing styrene-containing copolymers consists of reacting them with chloromethyl methyl ether; this grafts a reactive chloromethyl group onto the benzene nucleus of the styrene. This so-called chloromethylation step has little, if any, effect upon the acrylic ester copolymer which is usually the gel copolymer imbibed in the styrene-based macroreticular copolymer.

Subsequent aminolysis attacks the chloromethyl group, adding an amine to the copolymer molecule at that point: the amine is responsible for the bacis functional anion exchange sites. The acidic functional cation exchange sites are produced by hydrolizing the ester groups of poly(methyl methacrylate) in the gel copolymer to carboxylic acid groups through the action of caustic, to make a weakly acidic resin, or by sulfonation of the ester group to make a strongly acidic resin.

The above processes have been used to make thermally regenerable, hydrid ion exchange resins known to the art. Such resins do not achieve their full theoretical ion-exchange capacities, in part because of the phenomenon of self neutralization, which arises because of the presence of both acidic and basic functional groups in close proximity to one another on the same molecule.

The resins of the present invention are prepared by aminolyzing the styrene-containing, chloromethylated, macroporous host copolymer of a hybrid copolymer with a polyalkylene polyamine. Following aminolysis, the acrylic ester copolymer imbibed in the pores of the host copolymer is hydrolyzed by the known step of reacting with caustic solution, to form carboxylic acid functional groups. The resulting, thermally regenerable, hybrid ion-exchange resin possesses a significantly greater thermal salt capacity than similar, known resins aminolyzed with simple amines.

The polyalkylenepolyamines useful in this invention have the general formula:

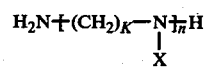

where
X is hydrogen, or

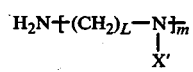

K is 2–4
L is 2–4
n is at least 2 and preferably 6 or greater.
m is at least 1 and
X' is defined identically to X; X and X' may be the same or different groups.

As indicated by the above formula, the polyalkylenepolyamine may be crosslinked at the amine sites. The molecular weight range over which the polyalkylene polyamine is useful is from about 100, and preferably about 600, to about 600,000. The preferred alkylene unit is —CH$_2$—CH$_2$—; thus the preferred value of K above is 2. Useful polyethylene polyamines in this invention are polyethyleneimines.

The polyethyleneimines useful in this invention are commercial materials produced by polymerizing ethyleneimine

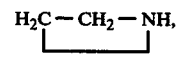

to form polyamines of varying molecular weight, characterized by the repeating unit,

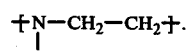

Polyethyleneimines (PEI) are available commercially in molecular weights of 600, 1200, 1800, and other molecular weights ranging to 60,000 or greater; these are average molecular weights, and they are approximate.

Because PEI is produced by a polymerization reaction, it contains tertiary amine groups at crosslink sites, in addition to the primary amine end groups and secondary amine groups within the chains. A typical PEI, such as the commercial material with a molecular weight of 1200, contains about 25% primary, 25% tertiary, and 50% secondary amine groups. While PEI with an average molecular weight of 600 may be used in the process of this invention, PEI with an average molecular weight of about 1200 or greater is preferred.

The reaction of polyethyleneimine, or PEI, with the chloromethylated styrene nuclei is thought to proceed quickly with the chloromethyl groups at or near the surface of the copolymer bead, the bulky PEI molecules not diffusing into the pores of the macroporous copolymer. This hypothetical mechanism would produce a physical separation between the amine groups found on the outside of the bead and the carboxylic acid groups on the gel polymer within the bead pores, and a correspondingly lessened tendency toward self neutralization. Evidence is found to support this hypothesis in the fact that the weakly basic functionality can be increased by increasing the PEI level until it approximates the theoretical level at which all surface chloromethyl groups would have been reacted. Beyond this level, porosity and ion exchange capacity decrease, an observation consistent with surface cross-linking of the PEI in the absence of pore penetration. Subsequent hydrolysis of the acrylic gel copolymer would produce carboxylic acid end groups not subject to self neutralization by amine groups within the pores.

The chloromethylated hybrid copolymers used to prepare the resins of the present invention are known to the art; their nature and preparation is set forth by Barrett, et al, in U.S. Pat. No. 3,991,107 which is hereby incorporated in this specification by reference. The suitable hybrid copolymers are those in which the macroporous host copolymer is prepared by polymerizing and crosslinking, as disclosed by Barrett, et al, above, monoethylenically unsaturated aromatic monomers such as styrene, o-, m-, and p-methylstyrenes, o-, m-, and p-ethylstyrenes, vinylnaphthalene, and vinyl toluene. Cross-linking agents for both the host copolymer and the gel copolymer are those disclosed to Barrett, et al, supra. The suitable gel copolymers which are imbibed into the pores of the host copolymer are prepared, again as disclosed by Barrett, et al, above, by polymerizing and crosslinking monoethylenically unsaturated acrylic monomers such as methyl acrylate, ethyl acrylate, propyl acrylate, isopropyl acrylate, butyl acrylate, tertiary butyl acrylate, ethylhexyl acrylate, cyclohexyl acrylate, ethoxy methyl acrylate, ethoxyethyl acrylate, ethoxypropyl acrylate, propoxymethyl acrylate, propoxyethyl acrylate, propoxypropyl acrylate, ethoxycyclohexyl acrylate, and the corresponding esters of methacrylic acid.

Other gel copolymers which may be used include those prepared from esters of itaconic acid, such as dimethyl itaconate, diethyl itaconate, dipropyl itaconate, diisopropyl itaconate, dibutyl itaconate, dihexyl itaconate, and mixed esters of itaconic acid, as for example, methyl ethyl itaconate.

The chloromethylation of hybrid copolymers, which involves reacting them with chloromethyl methyl ether, is exemplified by Barrett et al, above.

The following examples will further illustrate the invention, but are not intended to limit it. In the examples, as well as in the other parts of the specification and claims, parts and percentages are by weight unless otherwise stated. All chemicals used are of good commercial quality. The copolymers set forth below are in bead form, and are prepared by suspension or pearl polymerization techniques. All temperatures given in the examples are in ° C unless otherwise stated. Monomers used are commercial grades normally containing relatively small amounts of impurities or side products.

EXAMPLE 1

A mixture of 50 grams of chloromethylated hybrid copolymer intermediate prepared according to Example 15 of Barrett et al, above, 86 grams of PEI-12, a commercial grade of polyethyleneimine having an average molecular weight of approximately 1200, 106 grams of sodium carbonate, and 600 milliliters of commercial-grade dioxane is charged to a 1-liter, 3-necked flask equipped with a mechanical stirrer, reflux condenser, thermometer, and heating mantle with temperature monitor. The mixture is heated to reflux temperature and is allowed to reflux, with stirring for 6 hours. The flask contents are allowed to cool to ambient temperature, the solvent is filtered off, and the resin beads are washed several times with deionized water. The flask containing the beads is charged with 400 milliliters of deionized water and 100 milliliters of 50-weight-percent aqueous sodium hydroxide solution; the mixture is heated and allowed to reflux for 3 hours. After refluxing the mixture is allowed to cool to ambient temperature, and the resin is washed with deionized water until the wash water shows a neutral pH.

EXAMPLE 2

Chloromethylated hybrid copolymer is treated according to Example 1, except that the initial reflux period is 12 hours instead of 6 hours.

EXAMPLE 3

Chloromethylated hybrid copolymer is treated according to Example 1, except that the intitial reflux period is 18 hours.

Table I, below, shows the experimental data characterizing the three hybrid ion exchange resins prepared according to the above examples. Resin A of Table I is a conventional hybrid resin prepared from the same chloromethylated hybrid copolymer as the resins of the above examples, but aminolyzed with dimethylamine instead of the polyethyleneimine.

TABLE I

| Resin from Example | % Solids | TAEC | SB | AEC | CEC, pH | | TSC | pH | TSC | pH | TSC |
|---|---|---|---|---|---|---|---|---|---|---|---|
| 1 | 44.7 | 3.21 | 0.86 | 2.35 | 4.29 | 5.01 | 58.1 | 5.97 | 126.8 | 7.05 | 39.9 |
| 2 | 45.3 | 3.30 | 0.49 | 2.81 | 4.66 | 5.13 | 57.2 | 5.95 | 121.0 | 6.91 | 49.4 |
| 3 | 46.3 | 2.84 | 0.87 | 1.97 | 4.61 | 5.01 | 48.8 | 5.99 | 119.2 | 6.92 | 48.9 |
| Resin A | 38.3 | 2.77 | 0.60 | 2.17 | 5.18 | | | 5.9 | 98.1 | | |

In Table I above, TAEC is total anion exchange capacity, SB is strong base anion exchange capacity and AEC is weak base anion exchange capacity, all in milliequivalents of anions per gram of ion exchange resin. The term, CEC, is total cation exchange capacity in milliequivalents of cations per gram of ion exchange resin. The term, TSC, is thermal salt capacity; units are milligrams of sodium chloride per 15 cubic centimeters of ion exchange resin, and this capacity is determined by loading the resin with an aqueous solution of 500 weight parts per million sodium chloride at 25° C, the specified pH, and a flow rate of 8 resin-bed volumes per hour, and regenerating the resin with the 500 parts per million sodium chloride solution at the same flow rate and pH, and a temperature of 95° C. The thermal salt capacity of Resin A is determined at its optimum pH of 5.4.

As may be seen from Table I, the resins of this invention show a higher optimum pH, and an unexpected 20 to 30% improvement in thermal salt capacity, when compared with conventional hybrid ion-exchange resins.

It should be noted that little correlation exists between the ion exchange capacities, as they are commonly measured and the thermal salt capacity of a given resin. Anion exchange capacity is primarily a measure of the amount of polyamine that has reacted with the host copolymer; excess polyamine is added to the reaction mixture, and the amount of polyamine which reacts is controlled to some extent by the reaction time, with longer times usually producing a resin with more polyamine groups. As may be seen from Table I, this is not an absolute control, and the amount of polyalkylene polyamine actually grafted onto the host copolymer must be determined by measuring the anion exchange capacity. The preferred anion exchange capacity — that capacity contributed by the weak base, amine groups — is between about 1.8 and about 3.5, with values above 3.5 usually being associated with heavy crosslinking and reduced thermal salt capacity.

In the determination of the anion and cation exchange capacities, the resin is conditioned by passing hydrochloric acid, water and sodium hydroxide through it. For total anion exchange capacity the resin is loaded with chloride, and the chloride is eluted with sodium nitrate solution; the eluted chloride is titrated to determine the resin capacity. For strong base anion exchange capacity, the resin is loaded by passing the sodium hydroxide solution, followed by water and 1-normal sodium chloride solution. The chloride is eluted with sodium nitrate and titrated as for total anion exchange capacity. The weak base anion exchange capacity, or "anion exchange capacity" is the difference between these two values. Cation exchange capacity is determined by loading the resin with H+ ions from hydrochloric acid, adding a measured amount of known-normality base solution, shaking the resin with this solution, and titrating the remaining base in the solution.

We claim:

1. A heterogeneous hybrid, weak acid, weak base ion exchange resin comprising a crosslinked aromatic macroporous host copolymer having weak base functional anion exchange sites supplied by polyalkylene polyamine molecules having an average molecular weight of about 600 to about 60,000, grafted onto the aromatic nuclei, and a crosslinked, gel quest copolymer imbibed in the macropores of the host copolymer, the imbibed copolymer being functionalized with weak acid functional cation exchange sites.

2. A heterogeneous hybrid ion exchange resin according to claim 1 wherein said polyalkylene polyamine has the formula:

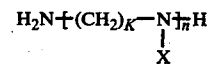

where
X is hydrogen or

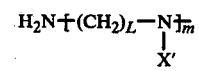

K is 2-4
L is 2-4
m is at least 1
n is at least 6,
X' is defined identically to X, and X and X' may be the same or different groups.

3. A heterogeneous hybrid ion exchange resin according to claim 2 wherein the amount of polyalkylene polyamine is sufficient to supply an anion exchange capacity of from about 1.8 to about 3.5 milliequivalents per gram of resin.

4. A heterogeneous hybrid ion exchange resin according to claim 2 wherein the average molecular weight of the polyalkylene polyamine molecules is at least about 1200.

5. A heterogeneous hybrid ion exchange resin according to claim 2 wherein the polyalkylene polyamine is a polyethyleneimine.

6. A heterogeneous hybrid, weak acid, weak base ion exchange resin according to claim 5 wherein the weak acid functionality of the resin is supplied by a crosslinked gel acrylic copolymer imbibed into the pores of the host copolymer, which gel copolymer possesses carboxylic acid functional cation exchange sites.

7. A process for making a heterogeneous hybrid, weak acid, weak base ion exchange resin which comprises subjecting the chloromethylated intermediate of a heterogeneous hybrid copolymer of a macroporous styrene-divinylbenzene host copolymer and a methyl acrylate-divinylbenzene gel copolymer within the macropores of the host copolymer to aminolysis with a polyethyleneimine having a molecular weight between about 600 and about 60,000, and subsequently hydrolyzing the methyl acrylate gel copolymer with caustic to weak acid functionality.

* * * * *